July 3, 1956  J. EPSTEIN  2,753,048
FILTERING TUBS AND DISCHARGE VALVES THEREFOR
Filed July 9, 1948
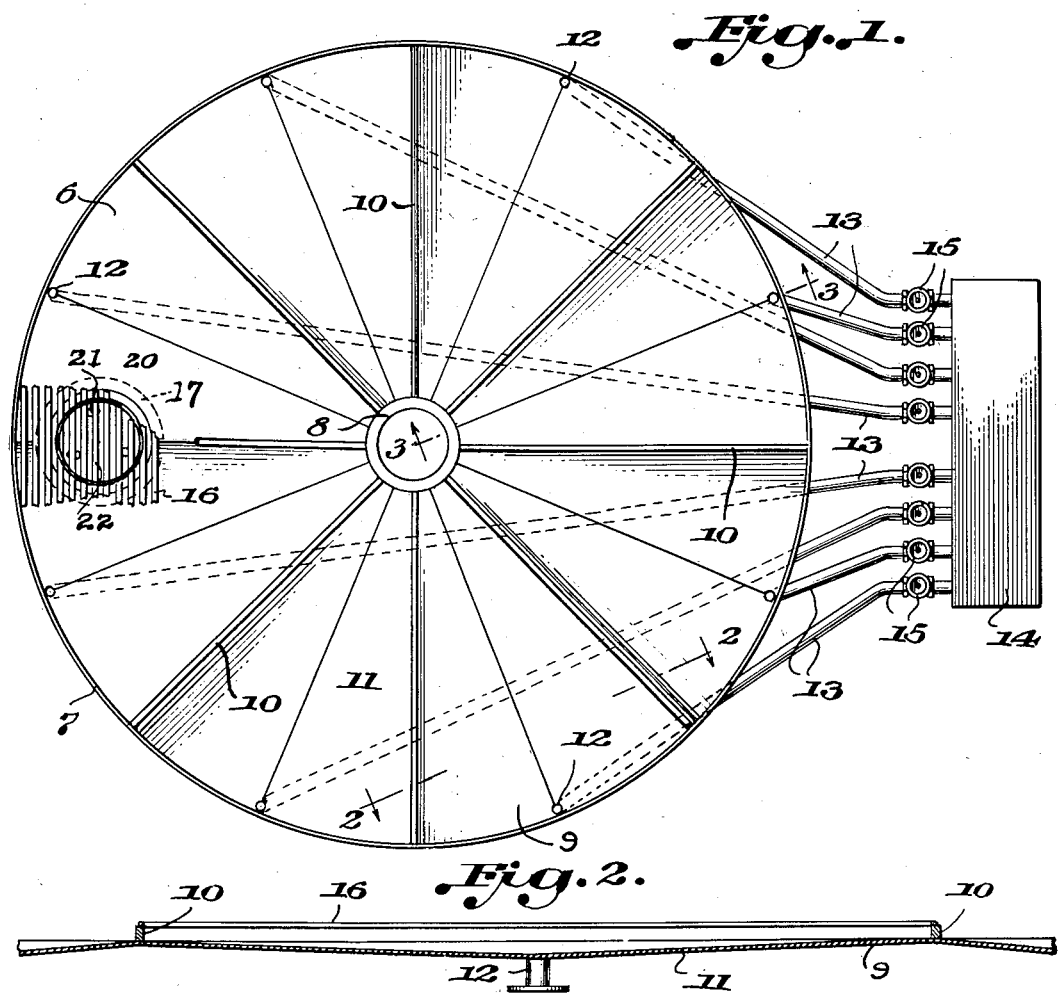
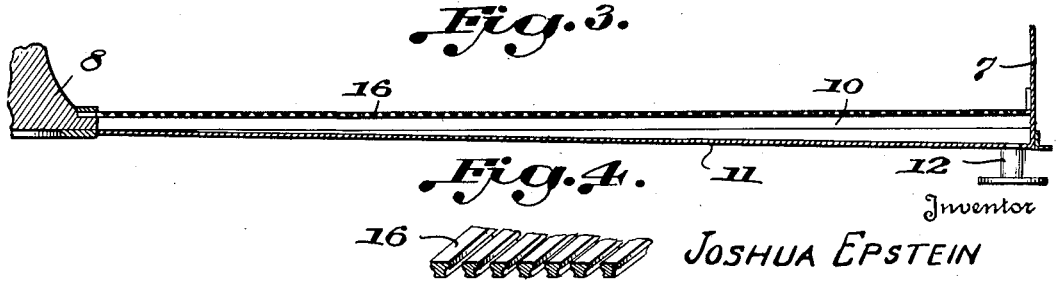
Joshua Epstein June
United States Patent Office 2,753,048
Patented July 3, 1956

2,753,048

FILTERING TUBS AND DISCHARGE VALVES THEREFOR

Joshua Epstein, Philadelphia, Pa., assignor to Acme Coppersmithing and Machine Company, Oreland, Pa., a corporation of Pennsylvania Application July 9, 1948, Serial No. 37,818

3 Claims. (Cl. 210—149)

The specification which follows relates to improvements in lauter tubs, mash tubs and other similar vessels from which liquids are to be drained prior to the discharge of the solids. Specifically, the improvement is in the arrangement of the tub bottom to facilitate drainage of liquids and the associated discharge valve.

In the mashing of grain and the like, after the steeping operation, the wort is required to be drained off of the spent grains without undue disturbance of the latter. It is then necessary to discharge the solid granular mass from the tub, vat or the like. Ordinarily, the space occupied by the discharge valve diminishes the effective area over which the draining and filtering operation takes place. It also establishes a depression for the accumulation of some liquid rather than its drainage with the remainder.

According to one feature of the invention herein, a grain discharge for the tub or tank is provided to permit the entire bottom surface of the tub to be effective for filtering purposes.

At the same time, provision is made to insure that all liquids draining through the false bottom above the grain discharge will be carried off with the remainder of the filtered liquid.

A further object of the invention is to provide for selective drainage of separate equal areas of the bottom individually so that the discharge can be controlled at will.

Another object of the invention is to proportion the bottom sections so that each section will provide a valley which inclines radially toward the outlet at the periphery and accommodates the increasing volume of liquid being drained. Thus the flow is rapid and this avoids any tendency for the liquid to stagnate or the flow to become sluggish and deposit sediment.

Among the objects of my invention is to design a tub bottom in radial sectors each of which will drain rapidly and independently even when the bottom as a whole is supported in a plane that is not horizontal.

By my arrangement the bottom is reinforced on radial lines by the ridges or ribs separating the several sections.

A still further object of the invention is to maintain a false bottom substantially continuous over the entire area of the tub without permitting any undesirable accumulation of liquid over the grain discharge valve itself.

Other objects of the invention will be apparent from the description which follows of the preferred form of my invention. This preferred form is shown in the accompanying drawings in which:

Figure 1 is a plan view of the improved lauter tank bottom;

Figure 2 is a vertical cross-section of the bottom of the tank on the line 2—2 on Figure 1;

Figure 3 is a vertical cross-section radially of the tank bottom taken on the line 3—3 on Figure 1; and, Figure 4 is a fragmentary perspective view of the grid.

Briefly considered, the invention consists in providing a false bottom for the lauter tank over the entire area of the latter. This includes the space above the gate valve so that maximum drainage is carried out. The false bottom is in the form of a grid or screen which is divided into sections each superimposed upon a drainage unit of the tank. Each such unit consists of a trough separated from the adjoining units by side ridges and having a central valley leading to a drainage outlet at the periphery. Each drainage unit is adapted to be drained independently of the adjacent ones.

The area over the discharge valve or trap also has a grid false bottom in the plane of the remainder of the tank bottom. This false bottom is spaced above and supported by the valve itself. The upper face of the valve is flush with the adjacent portions of the tank bottom and thus is drained through the adjoining valley without risk of accumulating liquid and sediment.

The grid element above the valve is arranged to be dropped with the valve when the latter is lowered into open position and thus permits free discharge of the granular material from above the false bottom.

In the drawings I have shown a mash tub or lauter tank 6 of generally cylindrical form having a circumferential side wall 7.

A center bearing 8 is provided in the center of the tank bottom 9.

The bottom 9 is separated by ridges or bars 10, 10 into any desired number of sectors. These bars rest on the bottom at the apices and support the false bottom grid. Each sector between the adjacent ridges forms a trough with a radial valley 11, 11, having also when desired a similar bar or rib on the trough at the bottom of the valley. This extends to adjacent the drain and serves to support the false bottom along this radius. As shown in Figure 3 each valley having opposite, flat, upwardly sloping side portions and the valley itself slopes downwardly toward the periphery. At the lowest point the valley is provided with an outlet 12. From the outlet 12, a drainage pipe 13 leads to a common grant 14. Each drain pipe has a manually operated valve 15 by which the drainage from each sector or valley can be effected.

The tank bottom 9 carries a rigid grid 16. This grid is composed of a number of sectoral sections. These sections rest at the center on the post 8 and radially upon the ridges 10, 10. Due to the close contact between the ridges 10 and the grid sections 16, the troughs are separated for individual discharge.

A discharge pipe 17 is bolted or otherwise fastened in an opening of the bottom 9. The corresponding segment or segments of the grid 16 are cut away to leave the area above the opening free.

A cover 20 either circular or rectangular, for a grain discharge valve, of either the swing type or drop type, is provided to fit loosely within the opening of the discharge pipe.

The upper surface of the cover 20 is provided with spaced lugs 21. These lugs carry a grid section 22 conforming to the shape of the tank and the corresponding opening in the grid 16. The grid 22 is in the same plane with the screen 16 and fits closely to it.

The design of the filtering tub as described in detail above permits drainage of the liquid over the entire bottom area and without any loss of efficiency due to the presence of the clean-out gate valve. Due to the fluted radial area of the bottom of the tank, increased strength is provided. This is further increased by the radial ribs or ridges supporting the false bottom.

The grid mounted above the discharge valve permits the liquid to drain off over this area. At the same time, since the top of the valve is flush with the bottom of the tank, the liquid and any sediment will be carried away without settling. Also, none can collect and be lost with the grains when the gate valve is dropped.

This arrangement of false bottom and gate valve forms a rugged construction and is economical to manufacture. It gives the maximum straining effect. Each individual sector of the bottom drains to the periphery independently. The slope of the valley allows the stream to increase to the outer edge where it is discharged rapidly. This avoids the necessity of varying the size of the drain pipe to care for the accumulated flow near the point of discharge.

As each sector has its own drainage, slight variation in the level of the tub bottom is of no significance. The drain of each sector from a point on its periphery is a great convenience in construction and allows the use of straight easily cleaned piping to the receiver. The use of cross beams or ribs at the ridges and optionally at the valley troughs is an advantage in distributing the weight of the mash on the grid.

While I have illustrated and described the preferred form of the invention, it has been only by way of example, and the scope of the invention in respect to materials and proportions is defined solely by the following claims.

I claim:

1. A filtering tank having a bottom, a center bearing and a circumferential wall at the periphery of the bottom, a series of spaced radial bars dividing the bottom into independent draining sectors extending from the bearing to the peripheral wall, each sector having flat, oppositely sloped portions meeting at their adjacent edges to provide a central valley extending radially thereof and of progressively increasing depth from the center bearing to the peripheral wall for causing each sector to drain to the periphery of the bottom to a separately controlled drain at the outer end of each valley, and a series of removable screen grid sectors similar in shape to the bottom sectors and disposed above the same, said grid sectors being supported by said center bearing and said radial bars.

2. A filtering tank having a divided bottom comprising a series of identical sectors and a common center bearing, each sector being formed with a median radial valley inclined downwardly toward the periphery, the bottom of each sector having flat sides sloping upwardly to merge with the sides of adjacent sectors and the whole surface of each sector being pitched toward the periphery, a drain at the outer end of each valley to which drain the filtrate flushes any sediment, a rib over the ridge between each pair of adjacent sector sides and a series of horizontal grid sectors supported on the center bearing and by their side edges on the ribs over the ridges.

3. A filtering tank having a divided bottom comprising a series of identical sectors, each sector being formed with a median radial valley inclined downwardly toward the periphery, the bottom of each sector having flat sides sloping upwardly to merge with the sides of adjacent sectors and the whole surface of each sector being pitched toward the periphery, a rib over the ridge between each pair of adjacent sector sides, a series of horizontal grid sectors supported by their side edges on the said ribs, a drain at the outer end of each valley to which the filtrate flushes any sediment, a receptacle, and an independent streamlined pipe connecting each drain to the common receptacle.

References Cited in the file of this patent

UNITED STATES PATENTS

| Number | Name | Date |
|---|---|---|
| 142,329 | Davis | Sept. 2, 1873 |
| 262,702 | Sears et al. | Aug. 15, 1882 |
| 513,215 | Strater | Jan. 23, 1894 |
| 801,032 | Metivie | Oct. 3, 1905 |
| 1,985,738 | Mullin | Dec. 25, 1934 |
| 2,003,892 | Keller | June 4, 1935 |
| 2,139,924 | Woodruff | Dec. 13, 1938 |
| 2,262,863 | Schock | Nov. 18, 1941 |
| 2,504,070 | Epstein | Apr. 11, 1950 |